United States Patent
Muramatsu et al.

(10) Patent No.: US 7,084,580 B2
(45) Date of Patent: Aug. 1, 2006

(54) DISCHARGE LAMP LIGHTING CIRCUIT

(75) Inventors: Takao Muramatsu, Shizuoka (JP); Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/916,024

(22) Filed: Aug. 11, 2004

(65) Prior Publication Data

US 2005/0035723 A1 Feb. 17, 2005

(30) Foreign Application Priority Data

Aug. 13, 2003 (JP) .......................... P. 2003-292715

(51) Int. Cl.
*H05B 37/02* (2006.01)

(52) U.S. Cl. .................. 315/219; 315/209 R; 315/291; 315/224

(58) Field of Classification Search ................ 315/291, 315/224, 307, 219, 209 R, DIG. 7, 276, DIG. 2, 315/212, DIG. 5; 363/131–133
See application file for complete search history.

(56) References Cited

U.S. PATENT DOCUMENTS

| | | | |
|---|---|---|---|
| 5,068,570 A | | 11/1991 | Oda et al. .................... 315/128 |
| 5,151,631 A | | 9/1992 | Oda et al. .................... 315/127 |
| 5,233,273 A | * | 8/1993 | Waki et al. .................. 315/224 |
| 5,406,471 A | * | 4/1995 | Yamanaka ................... 363/124 |
| 5,495,405 A | * | 2/1996 | Fujimura et al. ........... 363/133 |
| 5,714,845 A | * | 2/1998 | Heering et al. ............. 315/174 |
| 5,742,497 A | * | 4/1998 | Hashimoto et al. ..... 315/DIG. 7 |
| 6,034,487 A | | 3/2000 | Yamashita et al. .......... 315/244 |
| 6,188,180 B1 | | 2/2001 | Diamond .................... 315/289 |
| 2005/0035727 A1 | | 2/2005 | Muramatsu et al. ........ 315/219 |
| 2005/0062434 A1 | | 3/2005 | Muramatsu et al. ........ 315/291 |

FOREIGN PATENT DOCUMENTS

| | | |
|---|---|---|
| JP | 7-142182 | 6/1995 |
| JP | 7-169583 | 7/1995 |

OTHER PUBLICATIONS

Gulko et al., "A MHz Electronic Ballast for Automotive-Type HID Lamps," IEEE 1:39-45, Jun. 22, 1997.

* cited by examiner

*Primary Examiner*—Don Wong
*Assistant Examiner*—Ephrem Alemu
(74) *Attorney, Agent, or Firm*—Fish & Richardson P.C.

(57) ABSTRACT

A discharge lamp lighting circuit 1 has: a DC-AC converter circuit 3 which receives a DC input, and which conducts AC conversion and a boosting operation; and a starting circuit 4 which supplies a starting signal to a discharge lamp 10. The lighting circuit has a structure in which the primary and secondary circuits of an AC conversion transformer 7 constituting the DC-AC converter circuit 3 are electrically insulated from each other. An input terminal of the starting circuit 4 is connected to the secondary winding 7s of the AC conversion transformer 7 to obtain an input voltage for the starting circuit, and a starting signal which is boosted by the AC conversion transformer 7 is superimposed on the AC-converted output to be supplied to the discharge lamp 10.

7 Claims, 5 Drawing Sheets

DISCHARGE LAMP LIGHTING CIRCUIT

This application claims foreign priority based on Japanese Patent application No. 2003-292715, filed Aug. 13, 2003, the contents of which is incorporated herein by reference in its entirety.

BACKGROUND OF THE INVENTION

1. Field of the Invention

The present disclosure relates to a technique for providing a starting circuit suitable for a higher frequency in a discharge lamp lighting circuit.

2. Description of the Related Art

A known lighting circuit for a discharge lamp such as a metal halide lamp has a configuration which comprises a DC power source circuit formed as a DC-DC converter, a DC-AC converter circuit, and a starting circuit. For example, a DC voltage supplied from a battery is converted to a desired voltage by the DC power source circuit, the converted voltage is further converted to an AC output by the DC-AC converter circuit which is in a subsequent stage, and a starting signal (a so-called starter pulse) is superimposed on the AC output and then supplied to the discharge lamp (see, e.g., Japanese Patent Document JP-A-7-142182).

In such a configuration which conducts two steps of voltage conversion, which are DC voltage conversion and DC-AC conversion, when the circuit scale is large, the configuration is not suitable for miniaturization. Therefore, a configuration is used in which an output that is boosted by one step voltage conversion in a DC-AC converter circuit is supplied to a discharge lamp (see, e.g., Japanese Patent Document JP-A-7-169583).

In such conventional configurations, the starting circuits for a discharge lamp have a problem with the adaptability to a higher frequency.

When a secondary winding of a transformer (a so-called starter transformer) constituting a starting circuit is connected to a discharge lamp in series, and the output frequency of a DC-AC converter circuit being increased, for example, a large loss is produced in the transformer, thereby causing the lowering of efficiency. The increase of an operating frequency, which is the driving frequency of switching elements constituting a DC-AC converter circuit, is essential for miniaturizing the circuit, and hence the power loss in the starting circuit and the like must be suppressed to a low level as far as possible. When the voltage of the power supply to the starting circuit is low, problems of increase in cost and impeding of miniaturization may occur, such as those that circuit elements must have higher ratings in accordance with the increased current level, and the circuit scale becomes large.

SUMMARY OF THE INVENTION

It is an object of the invention to provide a discharge lamp lighting circuit in which a DC-AC converter circuit has functions of DC-AC conversion and a boost including a boost of a starting signal, which has a circuit configuration suitable for higher frequency, and which is small in size and economical.

In order to attain the object, the invention provides a discharge lamp lighting circuit comprising: a DC-AC converter circuit which receives a DC input, and which conducts AC conversion and a boosting operation; and a starting circuit which supplies a starting signal to a discharge lamp, a discharge lamp lighting circuit controls lighting of the discharge lamp by control means, controlling a power which is output from the DC-AC converter circuit, and has the following configurations.

(a) An AC conversion transformer constituting the DC-AC converter circuit is disposed, and primary and secondary circuits of the transformer are electrically insulated from each other, and the starting signal which is boosted by the AC conversion transformer is superimposed on the AC-converted output, and then supplied to the discharge lamp.

(b) An input terminal of the starting circuit is connected to a secondary winding of the AC conversion transformer to obtain an input voltage of the starting circuit.

Another mode of the invention has configurations shown in (c) and (d) in the following, in addition to (a) above.

(c) The DC-AC converter circuit has plural switching elements and a resonance capacitor, the switching elements are activated by the controlling means to make the resonance capacitor and an inductance component of the AC conversion transformer or an inductance element connected to the resonance capacitor resonate with each other in series, and a driving frequency of the switching elements is set to be equal to or higher than a resonance frequency.

(d) An auxiliary winding is additionally disposed which constitutes a transformer with the inductance element connected to the resonance capacitor of the DC-AC converter circuit, and an input terminal of the starting circuit is connected to the auxiliary winding.

In the above configurations, the following means may be additionally disposed:

a dedicated winding which is additionally disposed in the AC conversion transformer, and to which output terminals of the starting circuit are connected; and a rectifying element and a capacitor constituting the starting circuit, and a switch element connected to the capacitor. In this case, an output voltage when the switch element is made conductive during the increase of the voltage of the capacitor is applied to the primary winding of the AC conversion transformer or the dedicated winding.

In the invention, therefore, an AC conversion and a boosting operation are both conducted by the AC conversion transformer, and the AC conversion transformer can be used for boosting of the starting signal.

BRIEF DESCRIPTION OF THE DRAWINGS

FIG. 2 shows one example of the starting circuit.

FIG. 3 is a diagram showing another example of the starting circuit.

FIG. 4 is a diagram showing an example using a dedicated winding disposed in the AC conversion transformer.

FIG. 5 shows one example of the starting circuit.

FIG. 6 is a diagram showing another example of the starting circuit.

FIG. 7 is a diagram showing an example of a configuration using a dedicated winding disposed in the AC conversion transformer.

DESCRIPTION OF THE PRFERED EMBODIMENTS

Figure 1A:
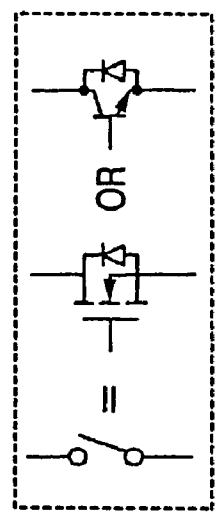
FIG. 1A is a diagram showing examples of semiconductor switching elements.
Figure 1:
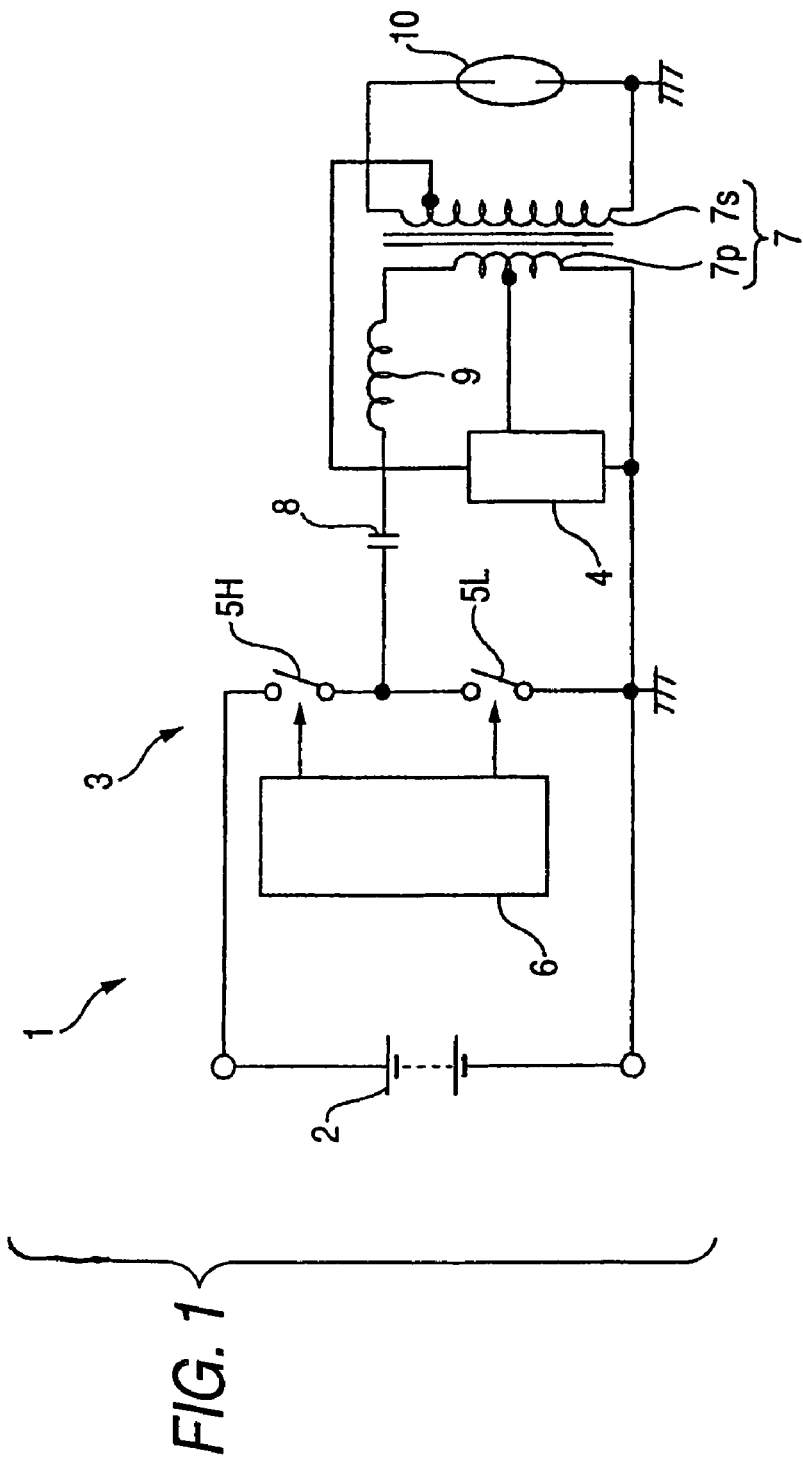
FIG. 1 is a diagram showing one example of the basic configuration of the invention.

FIG. 1 shows one example of the basic configuration of the invention. A discharge lamp lighting circuit 1 comprises a DC-AC converter circuit 3 which receives a power supply from a DC power source 2, and a starting circuit 4.

The DC-AC converter circuit 3 is disposed to receive a DC input voltage from a battery or the like, and to conduct AC conversion a boosting operation. In this example, the DC-AC converter circuit comprises two switching elements 5H, 5L, and controlling means 6 for activating the switching elements to control a switching operation. Specifically, one end of the switching element 5H on the higher side is connected to a power supply terminal, and the other end of the switching element is grounded through the switching element 5L on the lower side. The elements 5H, 5L are alternately turned ON/OFF by the controlling means 6. In FIG. 1, each of the elements 5H, 5L is shown simply by a symbol of a switch, however, specifically semiconductor switching elements such as field-effect transistors (FETs) or bipolar transistors are used as the elements as indicated in the broken-line frame in FIG. 1A. For example, when FETs are used, the ON/OFF state of each of the FETs is defined in accordance with the driving voltage which is supplied to the gate of the FET from the controlling means 6. As each FET itself has a parasitic diode, when both the FETs are in the OFF state, a current flows through the parasitic diodes. When bipolar transistors are used, a signal is supplied to each base from the controlling means 6, and the ON/OFF states are defined. When a diode is connected to each of the transistors in parallel, the current when both transistors are in the OFF state flows through the diodes.

The DC-AC converter circuit 3 comprises an AC conversion transformer 7, and has a structure in which primary and secondary circuits are electrically insulated from each other. In this example, a circuit configuration is used which is based on a resonance phenomenon between a resonance capacitor 8 and an inductor or an inductance component 9. For example, the following three kinds of modes are employed:

(I) a mode which uses a resonance phenomenon between the resonance capacitor 8 and an inductance element;

(II) a mode which uses a resonance phenomenon between the resonance capacitor 8 and the leakage inductance of the AC conversion transformer 7; and (III) a mode which uses a resonance phenomenon between the resonance capacitor 8, and the inductance element and the leakage inductance of the AC conversion transformer 7.

In the mode (I), the inductance element 9 such as a resonance coil is added in a positive way, and for example, one end of the element is connected to the resonance capacitor 8, and the capacitor is connected to a junction of the switching elements 5H and 5L. For example, the other end of the inductance element is connected to the primary winding 7p of the AC conversion transformer 7.

In the mode (II), the inductance component 9 of the AC conversion transformer 7 is used, and hence addition of a resonance coil or the like is not required. That is, one end of the resonance capacitor 8 is connected to the junction of the switching elements 5H and 5L, and the other end of the capacitor is connected to the primary winding 7p of the AC conversion transformer 7.

In the mode (III), a combined series reactance of the inductance element and the leakage inductance can be used.

In all the modes, the series resonance of the resonance capacitor 8 and the inductive element such as the inductance component and the inductance element is used, the driving frequency of the switching elements 5H, 5L is defined to a value which is equal to or higher than the series resonance frequency, and the switching elements are alternately turned ON/OFF. As a result, a discharge lamp 10 connected to the secondary winding 7s of the AC conversion transformer 7 can be sinusoidally lighted. The driving control of each switching elements by the controlling means 6 must be conducted so as to reciprocally drive each elements to prevent the elements from being simultaneously in the ON state, by controlling the ON duty or the like. The series resonance frequency is denoted as "f", the electrostatic capacitance of the resonance capacitor 8 as "Cr", the inductance of the inductance element as "Lr", and the primary inductance of the transformer 7 as "Lp1". In the mode (III), for example, before the discharge lamp is lighted on, "$f=f1=1/(2 \cdot \pi \cdot \sqrt{(Cr \cdot (Lr+Lp1))})$" is attained, and, after the discharge lamp is lighted on, "$f=f2 \cong 1/(2 \cdot \pi \cdot \sqrt{(Cr \cdot Lr)})$" is attained (f1<f2)

In the application of the invention, the controlling means 6 can be configured in any manner. For example, the following configuration may be employed. A circuit of controlling the no-load output voltage before the discharge lamp is lighted on, or that of controlling a transient input power after the discharge lamp is lighted on or the input power in a steady state is disposed to define a control voltage, the voltage is subjected to V (voltage)–F (frequency) conversion to obtain a pulse signal, and a signal which is obtained by shaping the pulse signal is sent as a control signal to the switching elements 5H, 5L.

The starting circuit 4 is disposed in order to supply the starting signal to the discharge lamp 10. An output of the starting circuit 4 in the starting process is boosted by the AC conversion transformer 7, and then applied to the discharge lamp 10. Here the starting signal is superimposed on the AC-converted output and then supplied to the discharge lamp.

Figure 4:
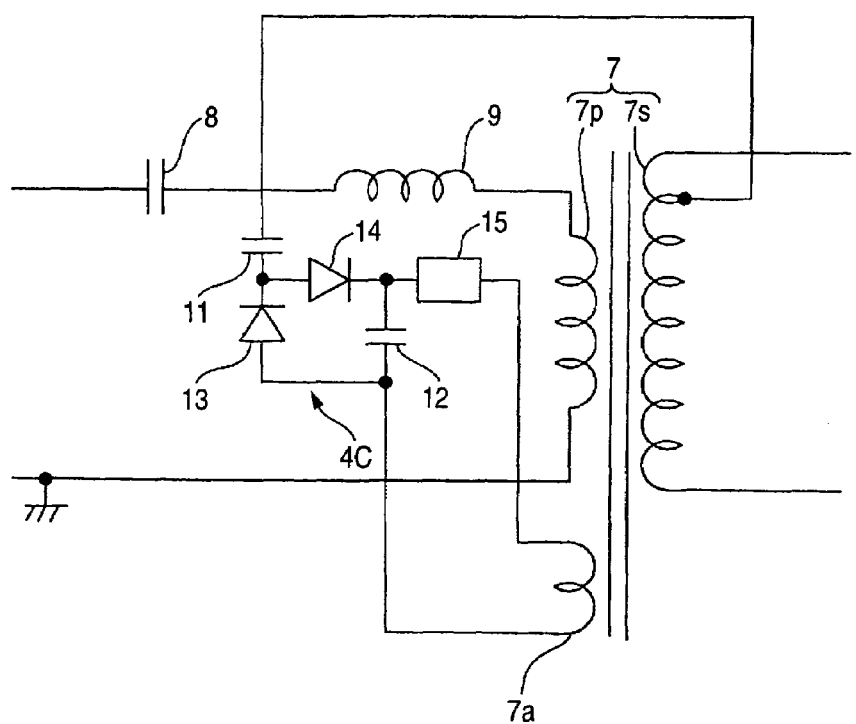
Figure 5:
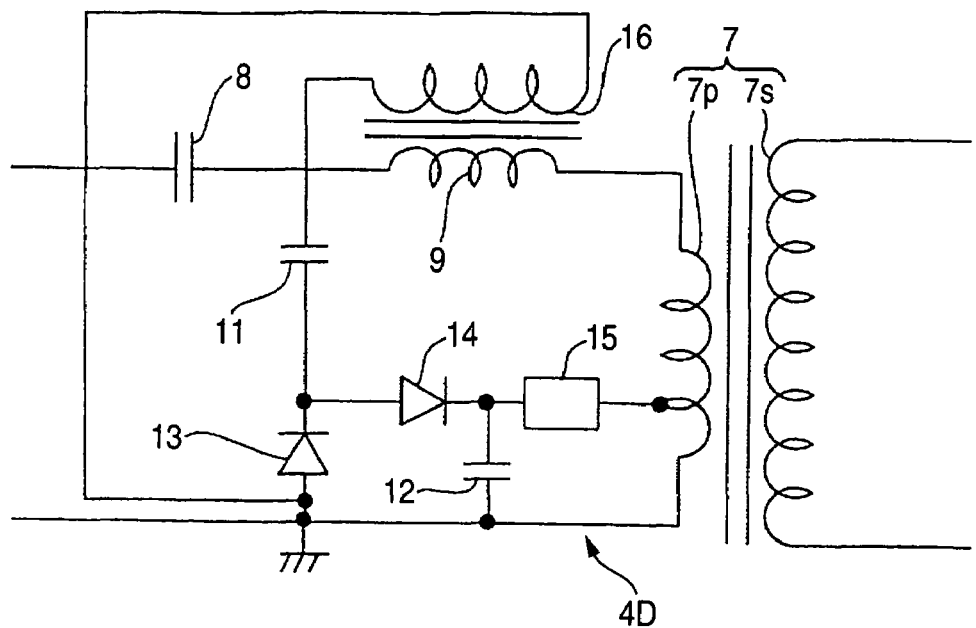
FIGS. 5, 6, and 7 are circuit diagrams showing examples of a configuration in which a transformer using an inductance element and an auxiliary winding supplies an input voltage to the starting circuit.
Figure 6:
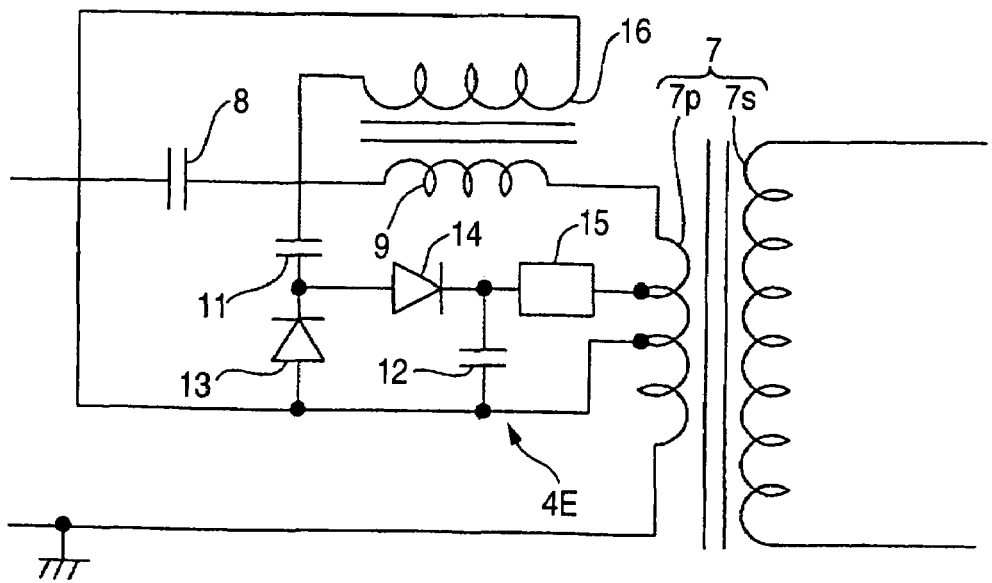
Figure 7:
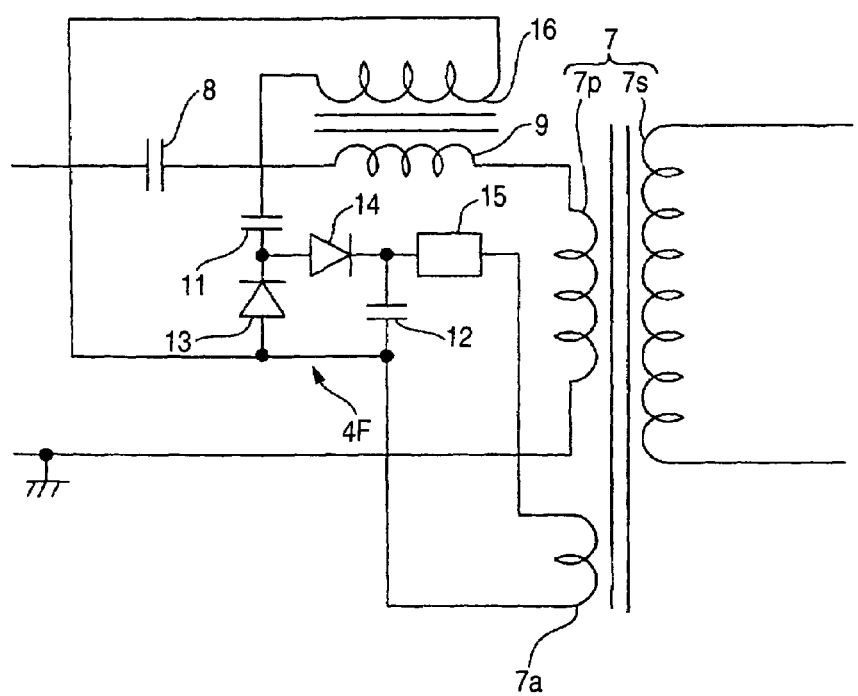

FIGS. 2 to 7 show examples of the starting circuit 4. The starting circuit may have one of the following modes:

(A) a mode in which input terminals of the starting circuit are connected to the secondary winding of the AC conversion transformer (see FIGS. 2 to 4); and (B) a mode in which an auxiliary winding is added which constitutes a transformer with the inductance element connected to the resonance capacitor, and an input terminal of the starting circuit is connected to the auxiliary winding (see FIGS. 5 to 7).

First, the mode (A) will be described. For example, the following modes will be employed:

(A1) a mode in which the output terminal of the starting circuit is connected to a middle of the primary winding of the AC conversion transformer (see FIGS. 2 and 3); and (A2) a mode in which the output terminal of the starting circuit is connected to a dedicated winding that is additionally disposed in the AC conversion transformer (see FIG. 4).

Figure 2:
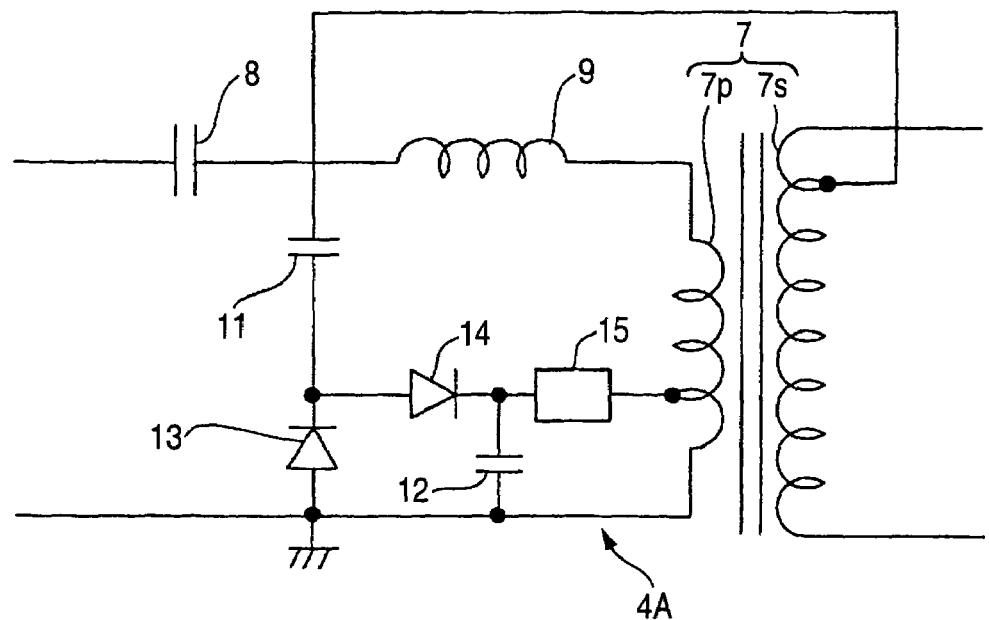
FIGS. 2, 3, and 4 are circuit diagrams showing modes of a starting circuit using the secondary voltage of an AC conversion transformer.
Figure 3:
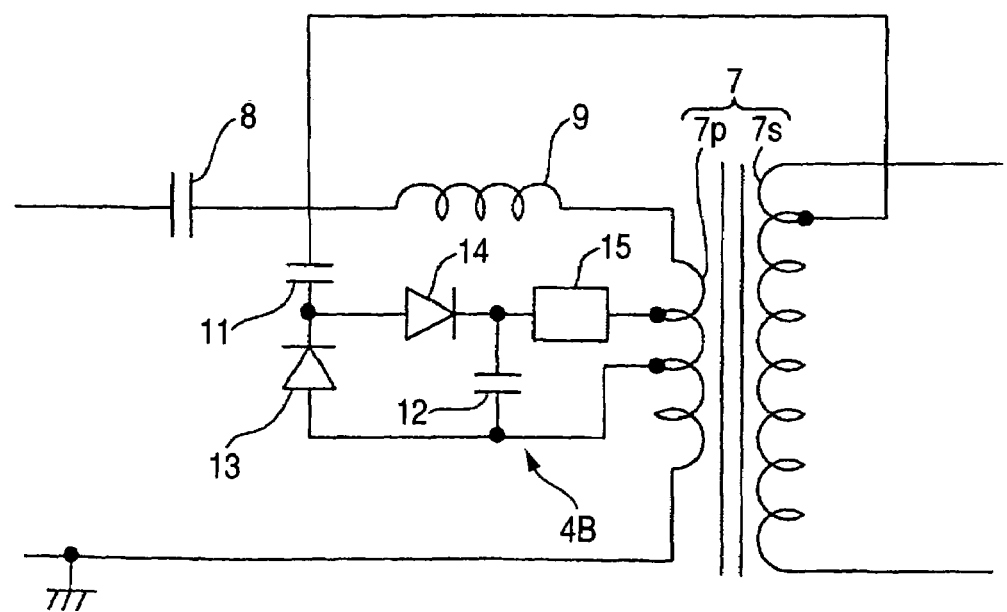

In the mode (A1), for example, as shown in FIG. 2, a mode in which one of output terminals of a starting circuit 4A is connected to a middle of the primary winding 7p of the AC conversion transformer 7, and the other output terminal is connected to one end (ground terminal) of the primary winding 7p, or as shown in FIG. 3, a mode in which both output terminals of a starting circuit 4B are respectively connected to middle of the primary winding 7p of the AC conversion transformer 7 may be employed.

The starting circuit 4 is configured by plural rectifying elements, capacitors, and a switch element. As the switch element, for example, a self-breakdown element such as a spark gap or a varistor, or a semiconductor element having a control terminal such as a thyristor, an IGBT (insulated gate bipolar transistor), or an FET may be used. In the illustrated example, the circuit comprises capacitors 11, 12, diodes 13, 14, and a switch element 15.

One end of the capacitor 11 is connected to the secondary winding 7s of the AC conversion transformer 7, and the other end of the capacitor 11 is connected to the cathode of the diode 13 and the anode of the diode 14. The cathode of the diode 14 is connected to a middle of the primary winding 7p through the switch element 15, and also to one end of the capacitor 12. In the example of FIG. 2, the other end of the capacitor 12 and the anode of the diode 13 are connected to the ground terminal of the primary winding 7p, and, in the example of FIG. 3, the other end of the capacitor 12 and the anode of the diode 13 are connected to a middle of the primary winding 7p. In both the configurations, in a charge pump circuit (voltage doubler circuit) using the diode and the capacitor, when charges are transferred to the capacitor 12 and the voltage across the capacitor is raised to a certain threshold, the switch element 15 is made conductive, and the output voltage is applied to the primary winding 7p of the AC conversion transformer 7. As a result, the boosted starting signal is applied to the discharge lamp 10, and the discharge lamp is lighted on.

When the number of turns of the portion, which is a part of the primary winding 7p, between the output terminals of the starting circuit 4 is denoted as "np", and that of the secondary winding 7s of the AC conversion transformer 7 is denoted as "ns", the output of the starting circuit 4 is boosted by "ns/np" times. For example, in the case of a discharge lamp which is used as a light source for an automobile, a pulse voltage of 20 kV or higher must be generated in the secondary side. When the starting circuit outputs a pulse voltage of 1 kV, therefore, a boosting ratio of "1:20" or larger is required. Since such a high voltage is generated during the starting process of a discharge lamp, the primary circuit of the AC conversion transformer 7 is electrically insulated from the secondary circuit.

In the mode (A2), as shown in FIG. 4, for example, the output voltage can be boosted by connecting each output terminal of a starting circuit 4C to a dedicated winding 7a which has less number of turns that of the primary winding 7p. This configuration is different from that of FIG. 3 in that one end of the switch element 15 is connected to one end of the dedicated winding 7a, and the junction of the capacitor 12 and the anode of the diode 13 is connected to the other end of the dedicated winding 7a. In this configuration, when charges are transferred to the capacitor 12 and the voltage of the capacitor is raised, the switch element 15 is made conductive, and the output voltage is applied to the dedicated winding 7a. The number of turns "np" corresponds to the number of turns of the dedicated winding 7a, and hence the output of the starting circuit 4C is boosted by "ns/np" times. The boosted starting signal is applied to the discharge lamp 10, and the discharge lamp is then lighted on.

In order to generate a pulse voltage having a peak value which is necessary for starting the discharge lamp 10 in the secondary side of the AC conversion transformer 7, a voltage which is as high as possible must be supplied to a capacitor in the starting circuit 4 to charge the capacitor. When the power supply voltage is low, such as in a situation that the rated voltage is low, or the actual power supply voltage is lower than the rated voltage, the resonance current must be increased, and hence the electric power loss is increased, or the rating and dielectric strength of the element must be enhanced. This causes problems such as a circuit scale enlargement, and an increase in the production cost. When the discharge lamp is lighted on, the primary current of the AC conversion transformer depends on the turn numbers of the primary and secondary windings of the transformer and the secondary current (lamp current). As the synthesized impedance of the resonance capacitor and the inductance component or the inductance element is smaller, the power loss can be made smaller. When the impedance is excessively small, however, there is the possibility that the resonance voltage before the discharge lamp is lighted on is not sufficiently raised. Therefore, it is required to magnify the resonance current, causing the increase in the power loss. By contrast, when the resonance voltage is low, the following disadvantages may be produced. In a configuration where the voltage is supplied to the starting circuit, for example, it is required to increase the number of steps of circuits (charge pump circuits) having a capacitor and a diode in the starting circuit, or increase the boosting ratio for the starting signal. Such countermeasures cause the circuit configuration to be complicated, or the transformer to become bulky.

In the mode (A), therefore, the problems are solved by obtaining the input voltage of the starting circuit, from the secondary side of the AC conversion transformer 7.

In order to stably control the discharge lamp after the discharge lamp is lighted on by generating the starting signal (pulse voltage), the driving frequency of the switching elements 5H, 5L is preferably set so that the frequency value after the discharge lamp is lighted on is higher than that before the starting signal is generated. In a state before the discharge lamp is lighted on by the application of the starting signal, the secondary circuit of the AC conversion transformer 7 is opened, and hence the transformer can be deemed equivalently as a choke coil. Therefore, the series resonance frequency is equal to f1 described above, and is lower than f2 in the light on state. During the starting process, consequently, the switching elements are controlled by the driving frequency in the vicinity of f1. After the discharge lamp is lighted on, the switching elements are controlled by the driving frequency which is positioned in the vicinity of the series resonance frequency f2 that is defined by the electrostatic capacitance of the resonance capacitor 8, and the leakage inductance of the AC conversion transformer 7, or the inductance of the inductance element, or a combined inductance of both inductances.

In the power control, the switching control is preferably conducted at the driving frequency which is higher than the series resonance frequency. When the driving frequency is made coincident with the series resonance frequency, as the maximum power can be output, the power is supplied as an initial power to the discharge lamp, therefore, lighting of the discharge lamp can be promoted so as to be rapidly transferred to the steady state. When the switching control is conducted at the driving frequency which is lower than the series resonance frequency, the combined impedance of the electrostatic capacitance of the resonance capacitor 8 and the inductance entereds in the capacitive region, and the power control falls in a state where it is hardly conducted. Therefore, it is preferable to control the driving frequency so as to avoid such a situation as far as possible.

Next, the mode (B) will be described. For example, the following modes will be employed:

(B1) a mode in which the output terminal of the starting circuit is connected to a middle of the primary winding of the AC conversion transformer (see FIGS. 5 and 6); and (B2) a mode in which the output terminal of the starting circuit is connected to a dedicated winding that is additionally disposed in the AC conversion transformer (see FIG. 7).

In (B1), as shown in FIG. 5, an auxiliary winding 16 is disposed for the resonance inductance element 9, and the ends of the winding are connected to each input terminals of a starting circuit 4D. In the example, the internal structure of the starting circuit 4 and the connection relationships with output terminals to the AC conversion transformer 7 are identical with those of the example of FIG. 2. Therefore, one end of the capacitor 11 is connected to one end of the auxiliary winding 16, and the other end of the winding is connected to the anode of the diode 13. The capacitors 11, 12 in the starting circuit 4D are charged by the voltage which is boosted by the inductance element 9 and the auxiliary winding 16. Alternatively, a configuration may be used in which, as shown in FIG. 6, both output terminals of a starting circuit 4E are respectively connected to middle of the primary winding 7p of the AC conversion transformer 7.

In (B2), as shown in FIG. 7, output terminals of a starting circuit 4F are connected to a dedicated winding 7a, so that the starting signal can be boosted by the dedicated winding 7a and the secondary winding 7s.

According to the configurations described above, it is possible to obtain the following advantages.

The maximum value of the circuit current flowing through the circuit is reduced, and hence the circuit burden and the power loss can be reduced. Also the circuit scale can be reduced, which is advantageous for miniaturization and cost reduction.

In the mode (B), depending on setting of the number of turns in the auxiliary winding 16, the input voltage of the starting circuit can be freely designed. Although the addition of the auxiliary winding 16 causes the increase in the number of parts by one, unlike the mode (A), it is not necessary to design the circuit by considering the influence of the generation of the starting signal on the input voltage.

According to the invention, it is not required to use a starter transformer which is connected to the discharge lamp in series, the loss due to a higher driving frequency can be reduced to enhance the efficiency, and the lighting circuit can be suitably used for miniaturization. In the boosting of the starting voltage and the power supply, the common AC conversion transformer is used, whereby the circuit configuration is simplified, which is effective in reduction of the cost.

In the configuration where the switching elements and the resonance capacitor are disposed, when the driving frequency of the switching elements is set to be equal to or higher than the resonance frequency, it is possible to assure the stability of the control.

Even when the voltage of the power supply to the lighting circuit is low, the configuration of (b) or (d) which is described above can reduce the maximum value of the circuit current, so that the circuit burden and the power loss can be reduced. As a result, the reliability can be enhanced. This configuration is suitable to the case when the maximum rated currents of circuit elements are to be lowered, and the scale of the starting circuit is to be reduced.

When the output terminal of the starting circuit is connected to the primary winding of the AC conversion transformer or to the dedicated winding, the starting signal can be boosted, and the starting circuit can be configured by a rectifying element, a capacitor, and a switch element. This is effective for simplification of the starting circuit.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A discharge lamp lighting circuit comprising:
a DC-AC converter circuit which receives a DC input to convert said DC input to an AC converted output and boost an operation thereof; a start up circuit which supplies a starting signal to a discharge lamp, and
controlling means controlling a power output from said DC-AC converter circuit to control switching of said discharge lamp, wherein
said DC-AC converter circuit includes at least a primary winding side circuit and a secondary winding side circuit, each being electrically insulated from the other, where the starting signal which is boosted by an AC conversion transformer is superimposed on the AC converted output so as to be supplied to said discharge lamp, and, further wherein
said starting circuit includes an input terminal which is connected to a secondary winding of said AC conversion transformer.

2. A discharge lamp lighting circuit comprising:
a DC-AC converter circuit which receives a DC input to convert said DC input to an AC converted output and boost an operation thereof; a start up circuit which supplies a starting signal to a discharge lamp, and
controlling means controlling a power output from said DC-AC converter circuit to control switching of said discharge lamp, wherein
said DC-AC converter circuit includes at least a primary winding side circuit and a secondary winding side circuit, each being electrically insulated from the other, where the starting signal which is boosted by an AC conversion transformer is superimposed on the AC converted output so as to be supplied to said discharge lamp, and, further wherein
said DC-AC converter circuit has a plurality of switching elements and a resonance capacitor where said plurality of switching elements are driven by said controlling means so that series resonance is performed between said resonance capacitor and an inductance component of said AC conversion transformer, or between said resonance capacitor and an inductance element connected to said resonance capacitor, with a driving frequency of said switching elements being set to be equal to or higher than a resonance frequency, further wherein
an auxiliary winding is provided with said inductance element to constitute a transformer separate from said AC conversion transformer where an input terminal of said starting circuit is connected to said auxiliary winding.

3. A discharge lamp lighting circuit according to claim 1, wherein
said DC-AC converter circuit has a plurality of switching elements and a resonance capacitor where said plurality of switching elements are driven by said controlling means so that series resonance is performed between said resonance capacitor and an inductance component of said AC conversion transformer, or between said resonance capacitor and an inductance element connected to said resonance capacitor, with a driving frequency of said switching elements being set to be equal to or higher than a resonance frequency.

4. A discharge lamp lighting circuit according to claim 1, wherein output terminals of said starting circuit are connected to taps of a primary winding of said AC conversion transformer, or to a dedicated winding which is smaller in number of turns than said primary winding, and which is additionally disposed in said AC conversion transformer, and the starting signal is applied from a secondary winding of said AC conversion transformer to said discharge lamp.

5. A discharge lamp lighting circuit according to claim 1, wherein said starting circuit has a rectifying element, a capacitor, and a switch element connected to said capacitor, and an output voltage when said switch element is made conductive during a process of raising a voltage of said capacitor is applied to said primary winding or said dedicated winding of said AC conversion transformer.

6. A discharge lamp lighting circuit according to claim 2, wherein output terminals of said starting circuit are connected to taps of a primary winding of said AC conversion transformer, or to a dedicated winding which is smaller in number of turns than said primary winding, and which is additionally disposed in said AC conversion transformer, and the starting signal is applied from a secondary winding of said AC conversion transformer to said discharge lamp.

7. A discharge lamp lighting circuit according to claim 2, wherein said starting circuit has a rectifying element, a capacitor, and a switch element connected to said capacitor, and wherein said starting circuit is adapted to output a voltage to said primary winding or said dedicated winding of said AC conversion transformer when said switching element becomes conductive as a result of raising a voltage across said capacitor.

* * * * *